United States Patent
Cavalcanti et al.

(10) Patent No.: US 12,284,551 B2
(45) Date of Patent: Apr. 22, 2025

(54) MULTI-LINK DEVICE (MLD) FOR REPORTING PER-PORT FRAME REPLICATION AND ELIMINATION FOR RELIABILITY (FRER) CAPABILITIES USING A PER-PORT FRER-CAPABILITIES OBJECT

(71) Applicant: Intel Corporation, Santa Clara, CA (US)

(72) Inventors: Dave A. Cavalcanti, Portland, OR (US); Juan Fang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/698,268

(22) Filed: Mar. 18, 2022

(65) Prior Publication Data

US 2022/0210696 A1 Jun. 30, 2022

Related U.S. Application Data

(60) Provisional application No. 63/170,133, filed on Apr. 2, 2021.

(51) Int. Cl.
*H04W 76/15* (2018.01)
*H04W 28/06* (2009.01)
(Continued)

(52) U.S. Cl.
CPC ........... *H04W 28/06* (2013.01); *H04W 76/15* (2018.02); *H04W 80/02* (2013.01); *H04W 84/12* (2013.01)

(58) Field of Classification Search
CPC ..... H04W 28/06; H04W 76/15; H04W 80/02; H04W 84/12
See application file for complete search history.

(56) References Cited

U.S. PATENT DOCUMENTS 11,388,060 B1* 7/2022 Subramanian .......... G06F 13/28
2015/0250731 A1* 9/2015 Hoppu ................. A61K 9/2009
424/490

(Continued)

OTHER PUBLICATIONS

Association of Computing Machinery (AMC) "Analysis of Frame Replication and Elemination for Time-Sensitive Networking"; Shifei Qian, Feng Luo and Jinpeng Xu; Jiading District Shanghai; (Dec. 8-10, 2017), pp. 166-170.*

(Continued)

*Primary Examiner* — Hassan A Phillips
*Assistant Examiner* — Prenell P Jones
(74) *Attorney, Agent, or Firm* — Schwegman Lundberg & Woessner, P.A.

(57) ABSTRACT

A multi-link device (MLD) configured for reporting per-port frame replication and elimination for reliability (FRER) capabilities uses a per-Port FRER-capabilities object generated by upper MLD MAC layer to indicate per-Port FRER capabilities of lower layers including lower MAC and PHY layers. The per-port FRER capabilities of the lower layers may be reported using the per-Port FRER-capabilities object to an upper layer such as an FRER layer. The per-Port FRER-capabilities object may indicate at least whether or not a port between the upper MLD MAC layer and the FRER layer supports frame replication and duplication elimination capabilities in the underlying MAC and PHY layers.

20 Claims, 6 Drawing Sheets

(51) Int. Cl.
   *H04W 80/02*  (2009.01)
   *H04W 84/12*  (2009.01)

(56) References Cited

U.S. PATENT DOCUMENTS

| | | | | |
|---|---|---|---|---|
| 2017/0118041 | A1* | 4/2017 | Bhattacharya | H04L 41/0895 |
| 2021/0297184 | A1* | 9/2021 | Huang | H04L 1/1642 |
| 2022/0182184 | A1* | 6/2022 | Wang | H04L 1/1893 |
| 2022/0210834 | A1* | 6/2022 | de la Oliva | H04L 1/08 |
| 2023/0232315 | A1* | 7/2023 | Chitrakar | H04W 48/16 370/329 |

OTHER PUBLICATIONS

"IEEE Draft Standard P802.11ax D5.0", Draft Standard for Information technologyPart 11: Wireless LAN Medium Access Control (MAC) and Physical Layer (PHY) SpecificationsAmendment 1: Enhancements for High Efficiency WLAN, (Oct. 2019), 772 pages.

"IEEE Draft Standard P802. 11ay D3.0", Draft Standard for Information TechnologyPart 11: Wireless LAN Medium Access Control (MAC) and Physical Layer (PHY) Specifications Amendment 2: Enhanced throughput for operation in license-exempt bands above 45 GH, (Feb. 2019), 763 pages.

"IEEE Draft Standard P802. 11-REVmdTM D2.4", Draft Standard for Information technologyPart 11: Wireless LAN Medium Access Control(MAC) and Physical Layer (PHY) Specifications, (Aug. 2019), 4632 pages.

"IEEE Standard 802.11ad", IEEE Standard for Information technologyPart 11: Wireless LAN Medium Access Control (MAC) and Physical Layer (PHY) SpecificationsAmendment 3: Enhancements forVery High Throughput in the 60 GHZ Band, (Dec. 28, 2012), 629 pages.

"IEEE Standard 802.11-2016", IEEE Standard for Information technologyPart 11: Wireless LAN Medium Access Control(MAC) and Physical Layer (PHY) Specifications, (Dec. 7, 2016), 3534 pages.

* cited by examiner

BSS

MULTI-LINK DEVICE (MLD) FOR REPORTING PER-PORT FRAME REPLICATION AND ELIMINATION FOR RELIABILITY (FRER) CAPABILITIES USING A PER-PORT FRER-CAPABILITIES OBJECT

PRIORITY CLAIM

This application claims priority under 35 U.S.C. 119(e) to U.S. Provisional Patent Application Ser. No. 63/170,133, filed Apr. 2, 2021 [reference number AD5673-Z] which is incorporated herein by reference in its entirety.

TECHNICAL FIELD

Embodiments pertain to wireless communications. Some embodiments relate to Frame Replication and Elimination for Reliability (FRER) in wireless networks including wireless local area networks (WLANS). Some embodiments relate to wireless networks configured to operate in accordance with the IEEE P802.CB standard and draft standards. Some embodiments relate to multi-link devices (MLDs) and multi-link operations (MLO).

BACKGROUND

New wireless standards, such as Wi-Fi 7 and 5G Rel. 16 are introducing capabilities to enable multi-link transmissions. One issue with multi-link operation relates to packet replication and duplicate packet elimination.

DETAILED DESCRIPTION

Figure 1:
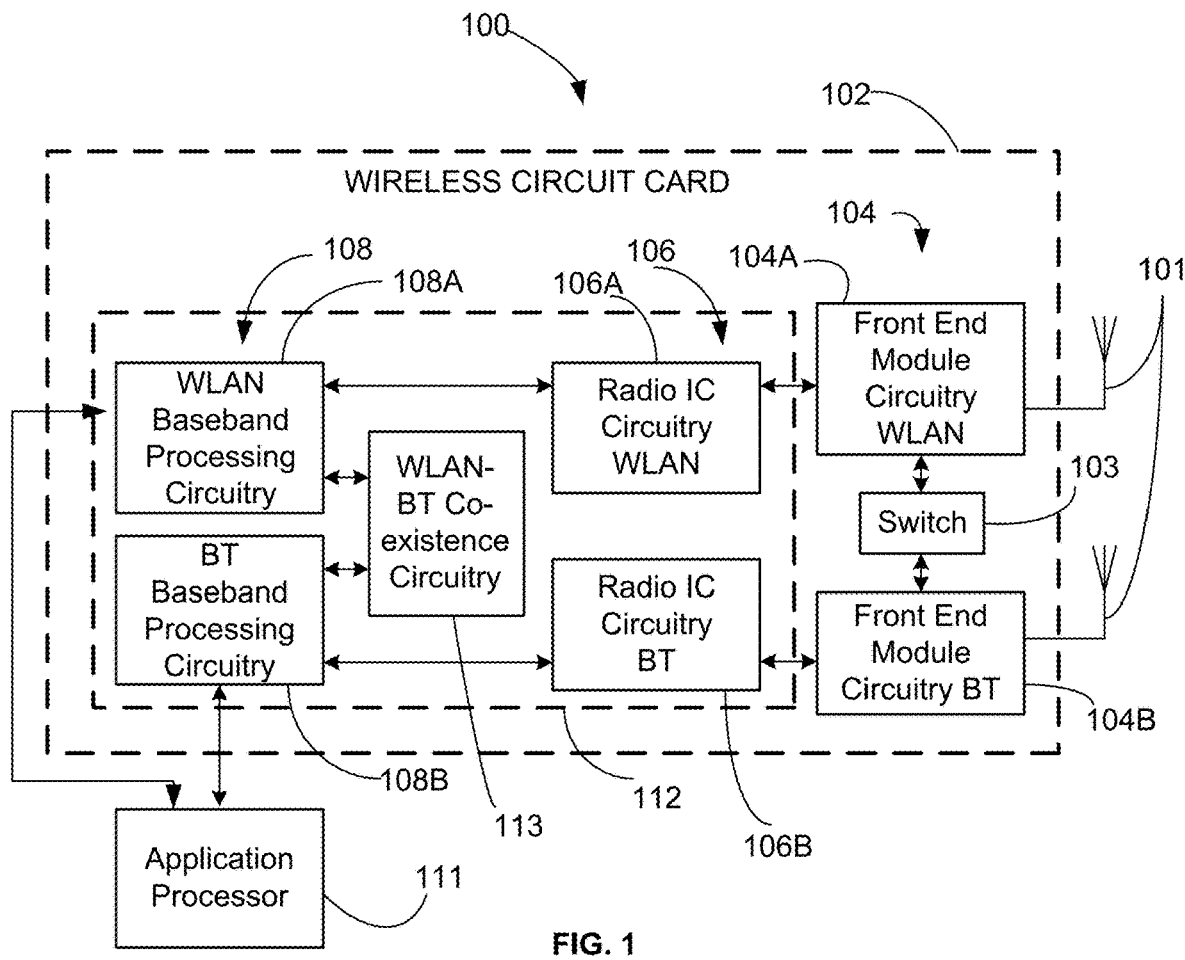
FIG. 1 is a block diagram of a radio architecture in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

New wireless standards, such as Wi-Fi 7 and 5G Rel. 16 are introducing capabilities to enable multi-link transmissions within the same MAC/PHY. For instance, 802.11be, which is defining the next generation Wi-Fi specification (Wi-Fi 7) has introduced the MLD (Multi-link Device) concept was enables multi-link transmissions within the same 802.11 MAC. 5G Rel. 16 has also defined a similar concept, the PDCP duplication. Therefore, in these new wireless standards, the wireless layer can already perform some of the 802.1CB task, namely, packet replication and duplicate packet elimination. While these new wireless capabilities are expected to provide better performance as the FRER feature is implemented directly by the MAC/PHY specific hardware/firmware (for both Wi-Fi and 5G), they also create a problem for the legacy 802.1CB operation. As the 802.1CB layer is not aware of the new FRER capabilities enabled in some wireless systems, 802.1CB will not be able to take advantage of such new capabilities in Wi-Fi 7 devices or 5G Rel. 16 systems. In other words, 802.1CB can only operate in using multiple interfaces/chipsets, but in future wireless systems, such capabilities will be available within a single device/chipset.

In one or more embodiments, a multi-link capabilities system may describe an approach to make the 802.1CB layer aware of the multi-link capabilities of the underlying MAC/PHY layer and adapt its behavior accordingly.

Other procedures only address specific standard changes in the 802.11 layer to support 802.1CB. Modifications to the existing 802.1CB standard to enable operation with wireless systems that implement multi-link transmission and duplicate data elimination have not been defined.

Example embodiments of the present disclosure relate to systems, methods, and devices for a new IEEE 802.1CB configuration and operation with wireless multi-link capabilities.

In one or more embodiments, a multi-link capabilities system may describe a configuration parameter for 802.1CB to make it aware of underlying MAC/PHY layers that support frame replication and elimination capabilities and adapt its behavior to better operate under new wireless capabilities, such as Wi-Fi 7 MLD and 5G Rel. 16 PDCP duplication capabilities.

In one or more embodiments, a multi-link capabilities system may enable 802.1CB to take advantage of new wireless capabilities (e.g., 802.11be MLD and 5G Rel. 16 PDCP duplication) and achieve lower latency and high reliability performance and a more cost-effective way, as only single device is required.

Some embodiments are directed to a multi-link device (MLD) configured for reporting per-port frame replication and elimination for reliability (FRER) capabilities using a per-Port FRER-capabilities object generated by upper MLD MAC layer to indicate per-Port FRER capabilities of lower layers including lower MAC and PHY layers. The per-port FRER capabilities of the lower layers may be reported using the per-Port FRER-capabilities object to an upper layer such as an FRER layer. The per-Port FRER-capabilities object may indicate at least whether or not a port between the upper MLD MAC layer and the FRER layer supports frame replication and duplication elimination capabilities in the underlying MAC and PHY layers. These embodiments, as well as others, are described in more detail below.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016-IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including the AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
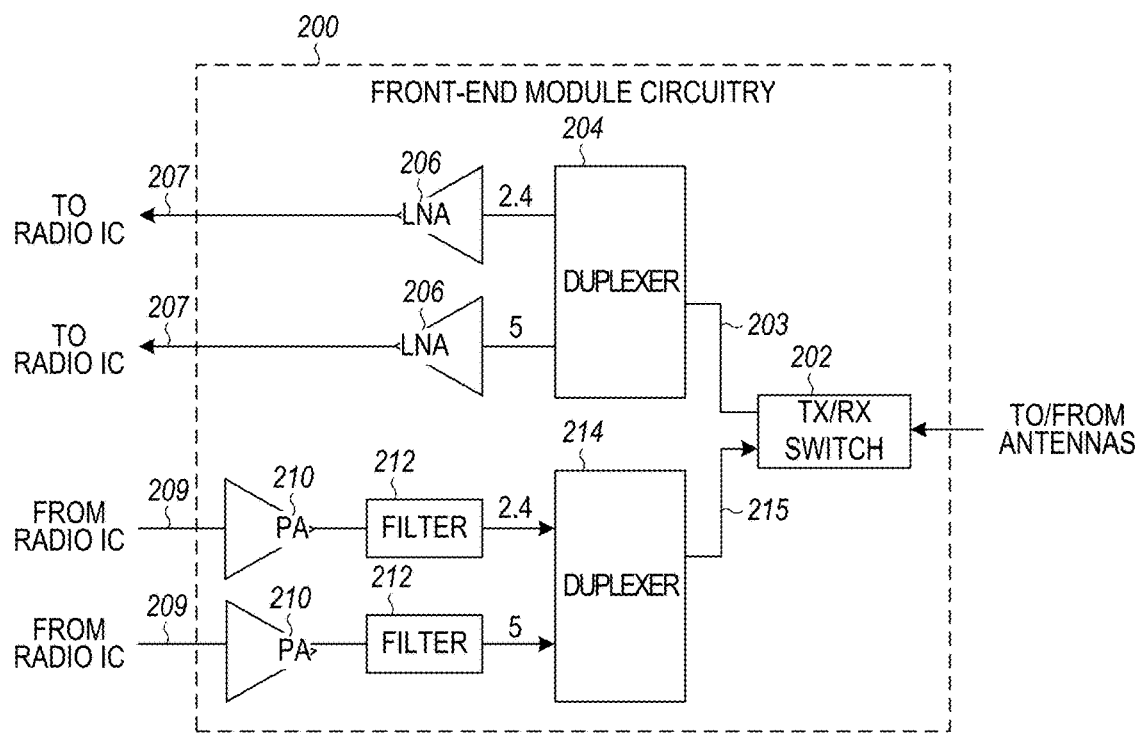
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
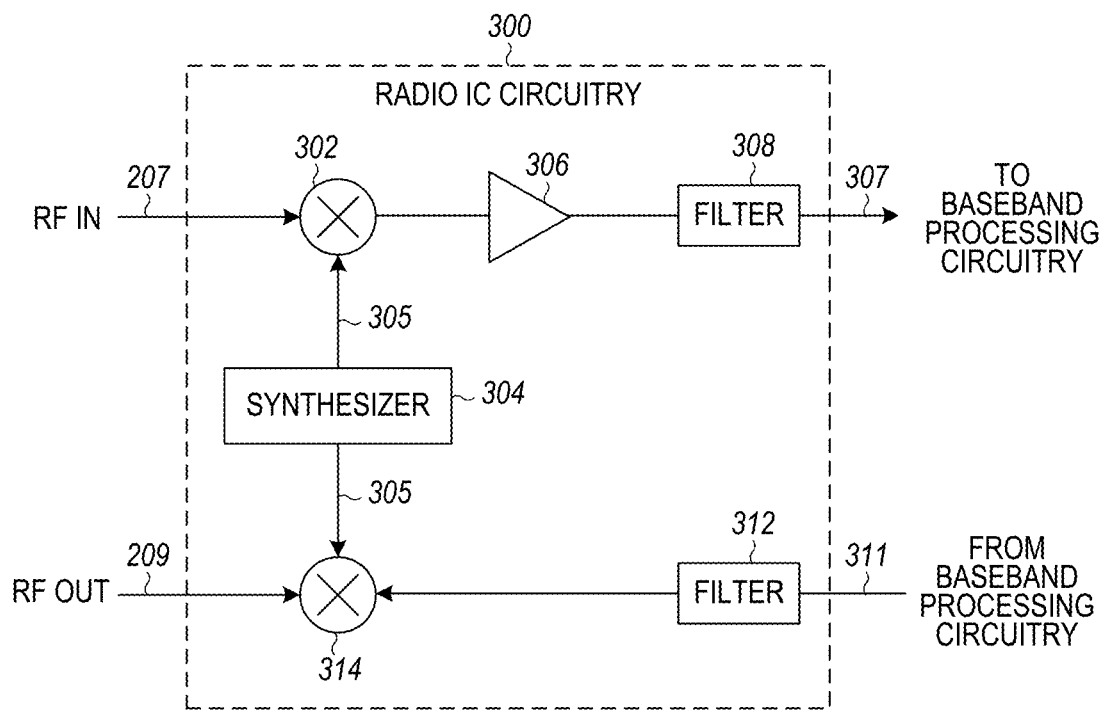
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
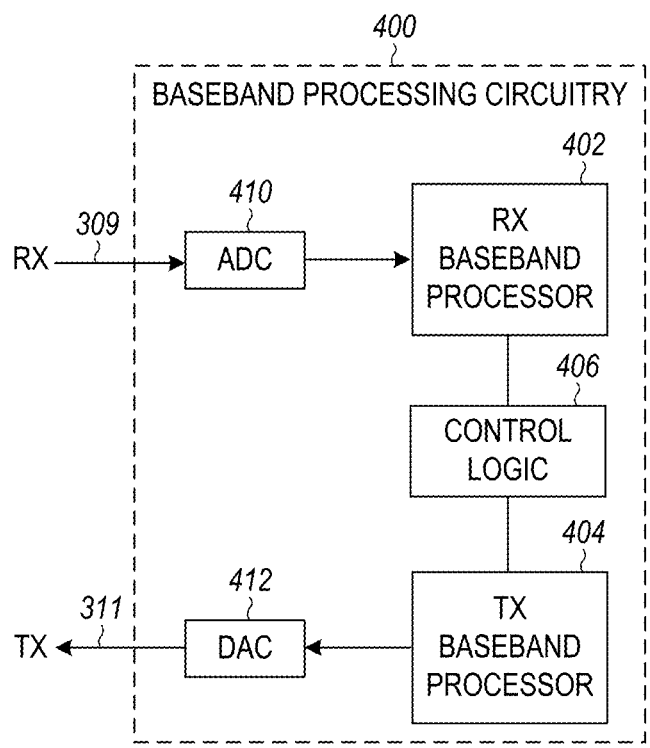
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
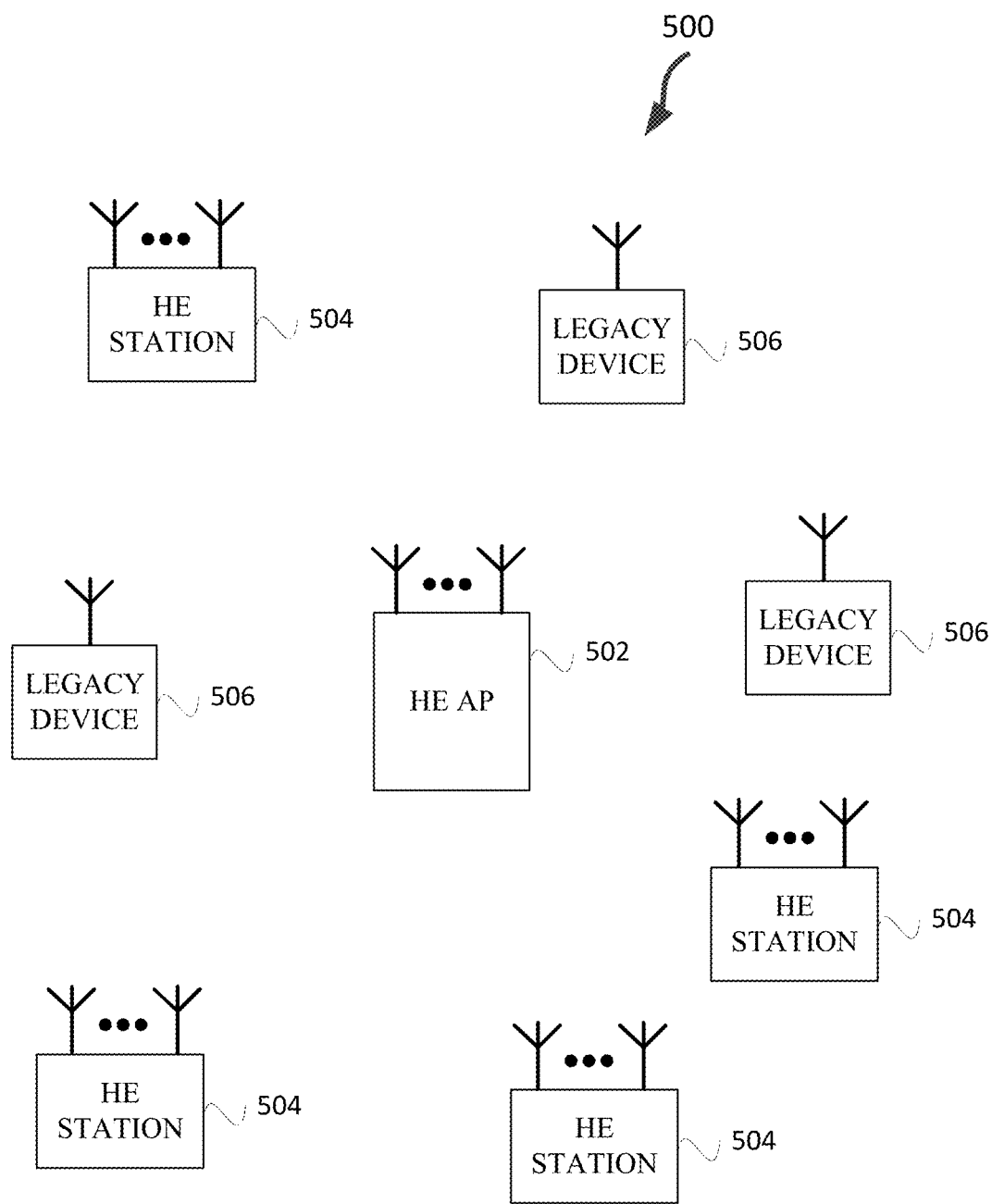
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506. In some embodiments, WLAN 500 may be configured for Extremely High Throughput (EHT) communications in accordance with the IEEE 802.11be standard and one or more stations including the AP 502 may be EHT STAs. In some embodiments, WLAN 500 may be configured for next generation vehicle-to-everything (NGV) communications in accordance with the IEEE 802.11bd standard and one or more stations including the AP 502 may be next generation vehicle-to-everything (NGV) stations (STAs).

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the HE station 504 and/or the HE AP 502 are configured to perform the methods and operations/functions described herein. In example embodiments, an apparatus of the HE station 504 and/or an apparatus of the HE AP 502 are configured to perform the methods and functions described herein. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
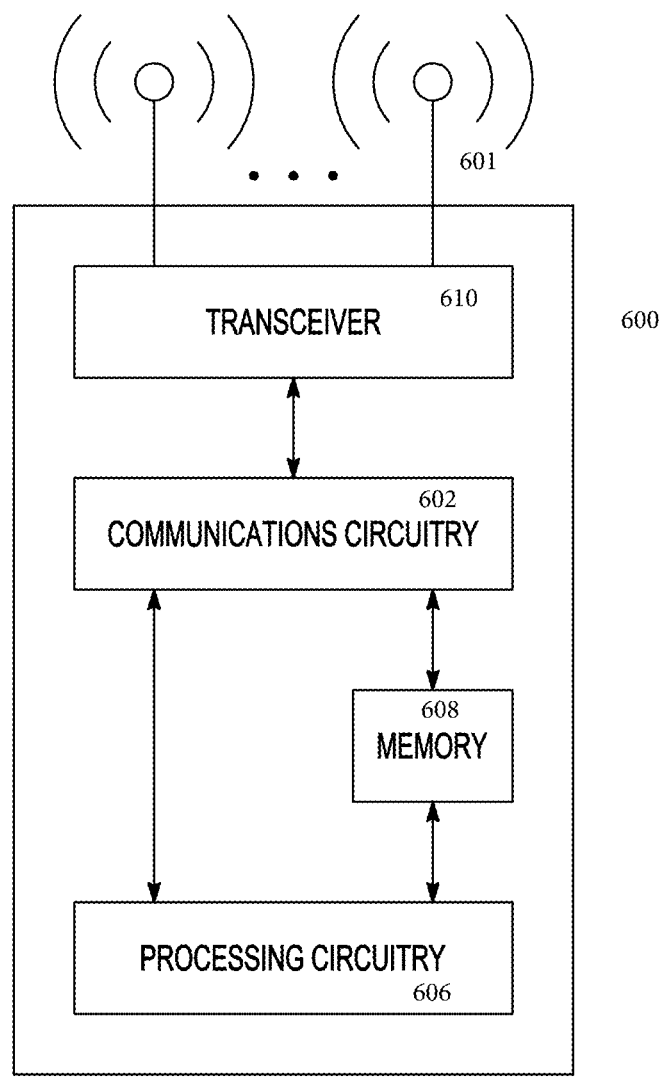
FIG. 6 is a function block diagram of a wireless communication device, in accordance with some embodiments.

FIG. 6 illustrates a functional block diagram of a wireless communication device, in accordance with some embodiments. In some embodiments, FIG. 6 illustrates a functional block diagram of a communication device (STA) that may be suitable for use as an AP STA, a non-AP STA or other user device in accordance with some embodiments. The communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

Figure 7:
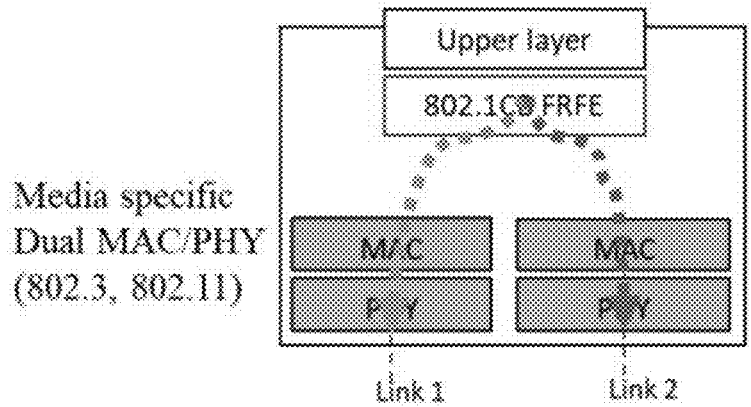
FIG. 7 illustrates protocol layers of a multi-link device (MLD) configured for FRER operation over two MAC/PHY interfaces.
Figure 8:
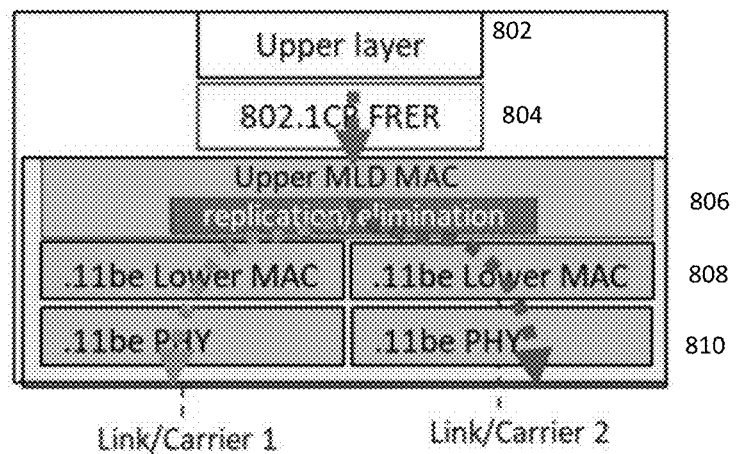
FIG. 8 illustrates protocol layers of a multi-link device (MLD) with integrated FRER operation, in accordance with some embodiments.

FIG. 7 illustrates protocol layers of a multi-link device (MLD) configured for FRER operation over two MAC/PHY interfaces. FIG. 8 illustrates protocol layers of a multi-link device (MLD) with integrated FRER operation, in accordance with some embodiments. The time-sensitive networking (TSN)-enabled networks must ensure every packet is delivered within a given latency bound with no packet losses and delays due to congestion. To account for device failure and/or media errors, packet replication and elimination capabilities for high reliability (FRER) were defined in IEEE 802.1CB to enable redundant links and paths, thus increasing the end-to-end system reliability. 802.1CB assumes multiple ports (e.g. Ethernet interfaces) are available and it performs packet duplication at the transmitting side and duplicate packet elimination at the receiving side. As shown in FIG. 7, 802.1CB creates two streams which are transmitted in two different links/ports. The streams include a Redundancy Tag with a sequence number that enables the elimination of duplicate packet at the receiving side.

The existing 802.1CB operation can work with 802.3 Ethernet and with 802.11 MAC/PHY with a few enhancements. In one or more embodiments, it is described how to move the replication and elimination into the MLD layer while adding the redundancy tag in the 802.1CB layer for the end to end redundancy and 802.11 MLD layer replication triggering. As shown in FIG. 8, the MLD in the transmitter will trigger frame replication upon the detection of the redundancy tag and send the duplicated frames over more than one affiliated STAs (multiple links). In the Ingress phase, the MLD in the receiver will eliminate duplicated frames based on per MLD block acknowledgement (BA) agreement. Currently, the 802.11be task group is working to define the specification changes required and behavior for triggering frame replication/elimination at MLD level. This behavior can be triggered by the detection of the 802.1CB redundancy tag in the received frame.

In one embodiment, a new per port object per-Port-FRER-capabilities is introduced to indicate whether the port supports frame replication and elimination capabilities in the underlying MAC/PHY. This object may also include optional parameters to describe the capabilities of the service.

TABLE 1 per-Port FRER-capability object description.

| Parameter | Description |
| --- | --- |
| FRERServiceSupported | Indicates the port supports packet replication and duplicate elimination |
| MaxLinksSupported | Indicates the maximum number of links supported. This parameter indicates that a stream may be replicated up to a maximum number of links. |
| FRERServiceType | Indicates the specific type of FRER, which may include:<br>1 - 802.11be MLD<br>2 - 5G PDCP duplication<br>3 and up - other/reserved |

TABLE 1-continued per-Port FRER-capability object description.

| Parameter | Description |
| --- | --- |
| FRERServiceSpecitificParameters | These are parameters that are specific to the type of FERE service that are exposed to the 802.1CB layer. For instance, it may include other constraints of the wireless technology (e.g. max frame size), etc. |

The per-Port FRER-capability object may be configured by typical TSN configuration protocols and interfaces (e.g. CNC NETCONF/YANG) interface or any other control plane protocol used in the network.

If the 802.1CB layer has the per-Port FRER-capability object configured, it assumes that the underlying ports (MAC/PHY) will implement frame duplication and duplicate elimination, and it only provides the Redundancy Tag for the stream and pass it on the lower layer, which will handle the FRER capability.

Some embodiments are directed to a multi-link device (MLD) 800 (FIG. 8) configured for reporting per-port frame replication and elimination for reliability (FRER) capabilities using a per-Port FRER-capabilities object.

In some embodiments, the MLD may be configured for multi-link operation (MLO) comprising communicating with another MLD over a plurality of links. For frame replication and elimination for reliability (FRER) operations, processing circuitry of the MLD may configure an upper MLD MAC layer 806 of the MLD to generate a per-Port FRER-capabilities object. In these embodiments, the per-Port FRER-capabilities object may indicate per-Port FRER capabilities of lower layers. The lower layers may comprise lower MAC and PHY layers. The processing circuitry of the MLD may also report the per-port FRER capabilities of the lower layers using the per-Port FRER-capabilities object to an upper layer. The upper layer may comprise an FRER layer 804. In some embodiments, the per-Port FRER-capabilities object may indicate at least whether or not a port between the upper MLD MAC layer 806 and the FRER layer 804 supports frame replication and duplication elimination capabilities in the underlying MAC and PHY layers. In some embodiments, the per-Port FRER-capabilities object indicates whether or not the lower layers have frame replication and duplication elimination capabilities.

In some embodiments, the per-Port FRER-capabilities object comprises a plurality of parameters includes a first parameter to indicate whether the port supports packet replication and duplicate elimination, a second parameter to indicate a maximum of links supported for stream/frame replication; a third parameter to indicate a FRER service type; and one or more optional FRER service-specific parameters specific to the FRER service type. An example of a per-Port FRER-capabilities object is illustrated in Table 1.

In some embodiments, the FRER layer 804 comprises an IEEE P802.1CB layer 804. In these embodiments, the FRER layer 804 may be configured to operate in accordance with an IEEE P802.1CB standard.

In some embodiments, for each supported link of the plurality of links, the lower layers comprising the MAC and PHY layers comprise: a lower MAC 808 and associated PHY layer 810, each lower MAC to operate in the protocol stack (illustrated in FIG. 8) below the single upper MLD layer 806. The protocol stack may comprise the FRER layer 804 in between an upper layer 802 and upper MLD MAC layer 806. Upper MLD MAC layer 806 may be provided above a lower levels, such as lower MAC layers 808 and PHY layers 810.

In some embodiments, the lower layers comprise a first lower MAC and associated PHY layer to support a first of the links, a second lower MAC and associated PHY layer to support a second of the links; and a third lower MAC and associated PHY layer to support a third of the links. In some WLAN embodiments, the first link may operate in the 2.4 GHz band, the second link may operate in the 5 GHz band and the third link operate in the 6 GHz band, although the scope of the embodiments is not limited in this respect. In some embodiments, the MAC and PHY layers may be configured for operations in accordance with other communication standards, such as 5G NR communication standards.

In some embodiments, the MLD may be configurable to operate as one of a STA MLD (non-AP MLD) and an AP MLD. In these embodiments, when the MLD is configured to operate as a STA MLD, the processing circuitry may encode the per-Port FRER-capabilities object for transmission to an AP MLD when associating with an AP MLD. In some embodiments, when the MLD is configured to operate as an AP MLD, the processing circuitry may report the per-port FRER capabilities using the per-Port FRER-capabilities object to a central controller during traffic stream negotiation for a Time-sensitive networking (TSN) operation requiring frame redundancy.

In some embodiments, the processing circuitry may configure the FRER layer 804 to perform multi-link frame duplication and duplicate frame elimination for the TSN operation based on the per-port FRER capabilities indicted by the per-Port FRER-capabilities object.

In some embodiments, when the FRER layer is configured with the per-Port FRER-capabilities object, for TSN operations requiring frame redundancy, the processing circuitry may configure the FRER layer to provide only a redundancy tag for a traffic stream to the upper MLD MAC layer 806 (i.e., the layer below the FRER layer 804).

In some of these embodiments, when operating as an AP MLD, the traffic stream may comprise Ethernet frames received by the AP MLD. The processing circuitry may configure the lower layers to duplicate transmissions of the frames for wireless transmission to a STA MLD. In these embodiments, duplication frames may be transmitted on different links and received over different links.

In some embodiments, the MLD may be a logical entity and has more than one affiliated station (STA) and the processing circuitry is configured to use a single medium access control (MAC) service access point (SAP) to logical link control (LLC), which includes one MAC data service, the MLD configured to support reception and transmission of frames on more than one link at a time. In some embodiments, the MLD may operation in accordance with an IEEE 802.11 standard, such as IEEE P802.11be/D1.3, November 2021.

In some embodiments, the processing circuitry may comprise baseband processor. In some embodiments, the MLD may comprise memory configured to store the per-Port FRER-capabilities object.

Some embodiments are directed to a non-transitory computer-readable storage medium that stores instructions for execution by processing circuitry of a multi-link device (MLD). In these embodiments, the processing circuitry may configure the MLD for multi-link operation (MLO) comprising communicating with another MLD over a plurality of links.

Some embodiments are directed to a multi-link device (MLD) configured to operate a station (STA) MLD. In these embodiments, processing circuitry may configure the MLD for multi-link operation (MLO) comprising communicating with an access point (AP) MLD over a plurality of links. For frame replication and elimination for reliability (FRER) operations, the processing circuitry may configure an upper MLD MAC layer 806 of the MLD to generate a per-Port FRER-capabilities object and may report the per-port FRER capabilities of the lower layers using the per-Port FRER-capabilities object to an upper layer. The upper layer may comprise an FRER layer 804. In these embodiments, the per-Port FRER-capabilities object may indicate at least whether or not a port between the upper MLD MAC layer 806 and the FRER layer 804 supports frame replication and duplication elimination capabilities in the underlying MAC and PHY layers. In these embodiments, the processing circuitry may also encode the per-Port FRER-capabilities object for transmission to an AP MLD when associating with the AP MLD.

Figure 9:
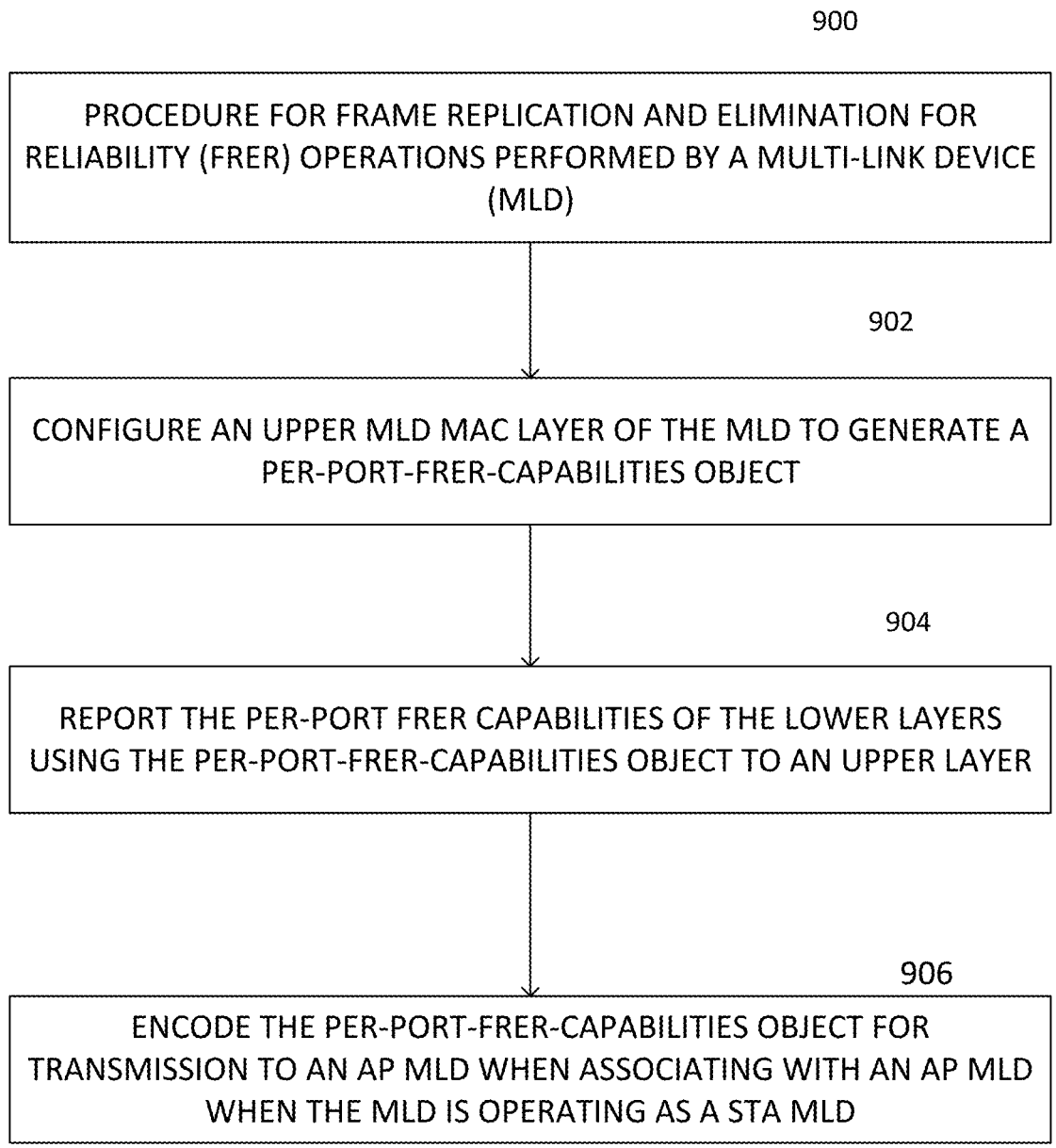
FIG. 9 is a procedure 900 for frame replication and elimination for reliability (FRER) operations performed by a multi-link device (MLD), in accordance with some embodiments.

FIG. 9 is a procedure 900 for frame replication and elimination for reliability (FRER) operations performed by a multi-link device (MLD), in accordance with some embodiments.

Operation 902 comprises configuring an upper MLD MAC layer 806 (FIG. 8) of the MLD to generate a per-Port-FRER-capabilities object. In some embodiments, the per-Port-FRER-capabilities object is configured to indicate per-Port FRER capabilities of lower layers. The lower layers may comprise MAC and PHY layers.

Operation 904 comprises reporting the per-port FRER capabilities of the lower layers using the per-Port-FRER-capabilities object to an upper layer. In some embodiments, the upper layer may comprise an FRER layer 804. In some embodiments, the per-Port-FRER-capabilities object may indicate at least whether or not a port between the upper MLD MAC layer 806 and the FRER layer 804 supports frame replication and duplication elimination capabilities in the underlying MAC and PHY layers.

Operation 906 comprises encoding the per-Port-FRER-capabilities object for transmission to an AP MLD when associating with an AP MLD when the MLD is operating as a STA MLD. Operation 906 comprises reporting the per-port FRER capabilities using the per-Port-FRER-capabilities object to a central controller during traffic stream negotiation for a Time-sensitive networking (TSN) operation requiring frame redundancy when the MLD is operating as an AP MLD.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a multi-link device (MLD), the apparatus comprising: processing circuitry; and memory, the processing circuitry to configure the MLD for multi-link operation (MLO) comprising communicating with another MLD over a plurality of links,
   wherein for frame replication and elimination for reliability (FRER) operations, the processing circuitry is to:
   configure an upper MLD MAC layer of the MLD to generate a per-Port FRER-capabilities object, the per-Port FRER-capabilities object to indicate per-Port FRER capabilities of lower layers, the lower layers comprising MAC and PHY layers; and
   report the per-port FRER capabilities of the lower layers using the per-Port FRER-capabilities object to an upper layer, the upper layer comprising an FRER layer,
   wherein the per-Port FRER-capabilities object indicates whether a port between the upper MLD MAC layer and the FRER layer supports frame replication and duplication elimination in the MAC and PHY layers.

2. The apparatus of claim 1, wherein the per-Port FRER-capabilities object comprises a plurality of parameters includes a first parameter to indicate whether the port supports packet replication and duplicate elimination, a second parameter to indicate a maximum of links supported; a third parameter to indicate a FRER service type; and one or more FRER service-specific parameters specific to the FRER service type.

3. The apparatus of claim 2, wherein the FRER layer comprises an IEEE P802.1CB layer.

4. The apparatus of claim 3, wherein, for each supported link of the plurality of links, the lower layers comprising the MAC and PHY layers comprise: a lower MAC and associated PHY layer, each lower MAC to operate below the upper MLD layer.

5. The apparatus of claim 4, wherein the lower layers comprise: a first lower MAC and associated PHY layer to support a first of the links, a second lower MAC and associated PHY layer to support a second of the links; and a third lower MAC and associated PHY layer to support a third of the links.

6. The apparatus of claim 5, wherein the MLD configurable to operate as one of a STA MLD and an AP MLD,
   wherein when the MLD is configured to operate as a STA MLD, the processing circuitry is configured to encode the per-Port FRER-capabilities object for transmission to an AP MLD when associating with an AP MLD, and wherein when the MLD is configured to operate as an AP MLD, the processing circuitry is configured to report the per-port FRER capabilities using the per-Port FRER-capabilities object to a central controller during traffic stream negotiation for a Time-Sensitive Networking (TSN) operation requiring frame redundancy.

7. The apparatus of claim 6, wherein the processing circuitry is to configure the FRER layer to perform multi-link frame duplication and duplicate frame elimination for the TSN operation based on the per-port FRER capabilities indicted by the per-Port FRER-capabilities object.

8. The apparatus of claim 7, wherein when the FRER layer is configured with the per-Port FRER-capabilities object, for TSN operation requiring frame redundancy, the processing circuitry is to configure the FRER layer to provide a redundancy tag for a traffic stream to the upper MLD MAC layer.

9. The apparatus of claim 1, wherein the MLD is a logical entity and has more than one affiliated station (STA) and the processing circuitry is configured to use a single medium access control (MAC) service access point (SAP) to logical link control (LLC), which includes one MAC data service, the MLD configured to support reception and transmission of frames on more than one link at a time.

10. The apparatus of claim 9, wherein the processing circuitry comprises a baseband processor; and wherein the memory is configured to store the per-Port FRER-capabilities object.

11. A non-transitory computer-readable storage medium that stores instructions for execution by processing circuitry of a multi-link device (MLD), the processing circuitry to configure the MLD for multi-link operation (MLO) comprising communicating with another MLD over a plurality of links,
wherein for frame replication and elimination for reliability (FRER) operations, the processing circuitry is to:
configure an upper MLD MAC layer of the MLD to generate a per-Port FRER-capabilities object, the per-Port FRER-capabilities object to indicate per-Port FRER capabilities of lower layers, the lower layers comprising MAC and PHY layers; and
report the per-port FRER capabilities of the lower layers using the per-Port FRER-capabilities object to an upper layer, the upper layer comprising an FRER layer,
wherein the per-Port FRER-capabilities object indicates whether a port between the upper MLD MAC layer and the FRER layer supports frame replication and duplication elimination in the MAC and PHY layers.

12. The non-transitory computer-readable storage medium of claim 11, wherein the per-Port FRER-capabilities object comprises a plurality of parameters includes a first parameter to indicate whether the port supports packet replication and duplicate elimination, a second parameter to indicate a maximum of links supported; a third parameter to indicate a FRER service type; and one or more FRER service-specific parameters specific to the FRER service type.

13. The non-transitory computer-readable storage medium of claim 12, wherein the FRER layer comprises an IEEE P802.1CB layer.

14. The non-transitory computer-readable storage medium of claim 13, wherein, for each supported link of the plurality of links, the lower layers comprising the MAC and PHY layers comprise: a lower MAC and associated PHY layer, each lower MAC to operate below the upper MLD layer.

15. The non-transitory computer-readable storage medium of claim 14, wherein the lower layers comprise: a first lower MAC and associated PHY layer to support a first of the links, a second lower MAC and associated PHY layer to support a second of the links; and a third lower MAC and associated PHY layer to support a third of the links.

16. The non-transitory computer-readable storage medium of claim 15, wherein the MLD configurable to operate as one of a STA MLD and an AP MLD,
wherein when the MLD is configured to operate as a STA MLD, the processing circuitry is configured to encode the per-Port FRER-capabilities object for transmission to an AP MLD when associating with an AP MLD, and
wherein when the MLD is configured to operate as an AP MLD, the processing circuitry is configured to report the per-port FRER capabilities using the per-Port FRER-capabilities object to a central controller during traffic stream negotiation for a Time-Sensitive Networking (TSN) operation requiring frame redundancy.

17. The non-transitory computer-readable storage medium of claim 16, wherein the processing circuitry is to configure the FRER layer to perform multi-link frame duplication and duplicate frame elimination for the TSN operation based on the per-port FRER capabilities indicted by the per-Port FRER-capabilities object.

18. The non-transitory computer-readable storage medium of claim 17, wherein when the FRER layer is configured with the per-Port FRER-capabilities object, for TSN operation requiring frame redundancy, the processing circuitry is to configure the FRER layer to provide a redundancy tag for a traffic stream to the upper MLD MAC layer.

19. An apparatus of a multi-link device (MLD) configured to operate a station (STA) MLD, the apparatus comprising: processing circuitry; and memory, the processing circuitry to configure the MLD for multi-link operation (MLO) comprising communicating with an access point (AP) MLD over a plurality of links,
wherein for frame replication and elimination for reliability (FRER) operations, the processing circuitry is to:
configure an upper MLD MAC layer of the MLD to generate a per-Port FRER-capabilities object, the per-Port FRER-capabilities object to indicate per-Port FRER capabilities of lower layers, the lower layers comprising MAC and PHY layers; and
report the per-port FRER capabilities of the lower layers using the per-Port FRER-capabilities object to an upper layer, the upper layer comprising an FRER layer,
wherein the per-Port FRER-capabilities object indicates whether a port between the upper MLD MAC layer and the FRER layer supports frame replication and duplication elimination in the MAC and PHY layers; and
encode the per-Port FRER-capabilities object for transmission to an AP MLD when associating with the AP MLD.

20. The apparatus of claim 19, wherein the per-Port FRER-capabilities object comprises a plurality of parameters includes a first parameter to indicate whether the port supports packet replication and duplicate elimination, a second parameter to indicate a maximum of links supported; a third parameter to indicate a FRER service type; and one or more FRER service-specific parameters specific to the FRER service type.

\* \* \* \* \*